Aug. 20, 1935.  W. BYRD, JR  2,012,181
FAULTY CONDUCTOR CUT-OUT FOR ELECTRICAL DISTRIBUTION SYSTEMS
Filed June 22, 1933
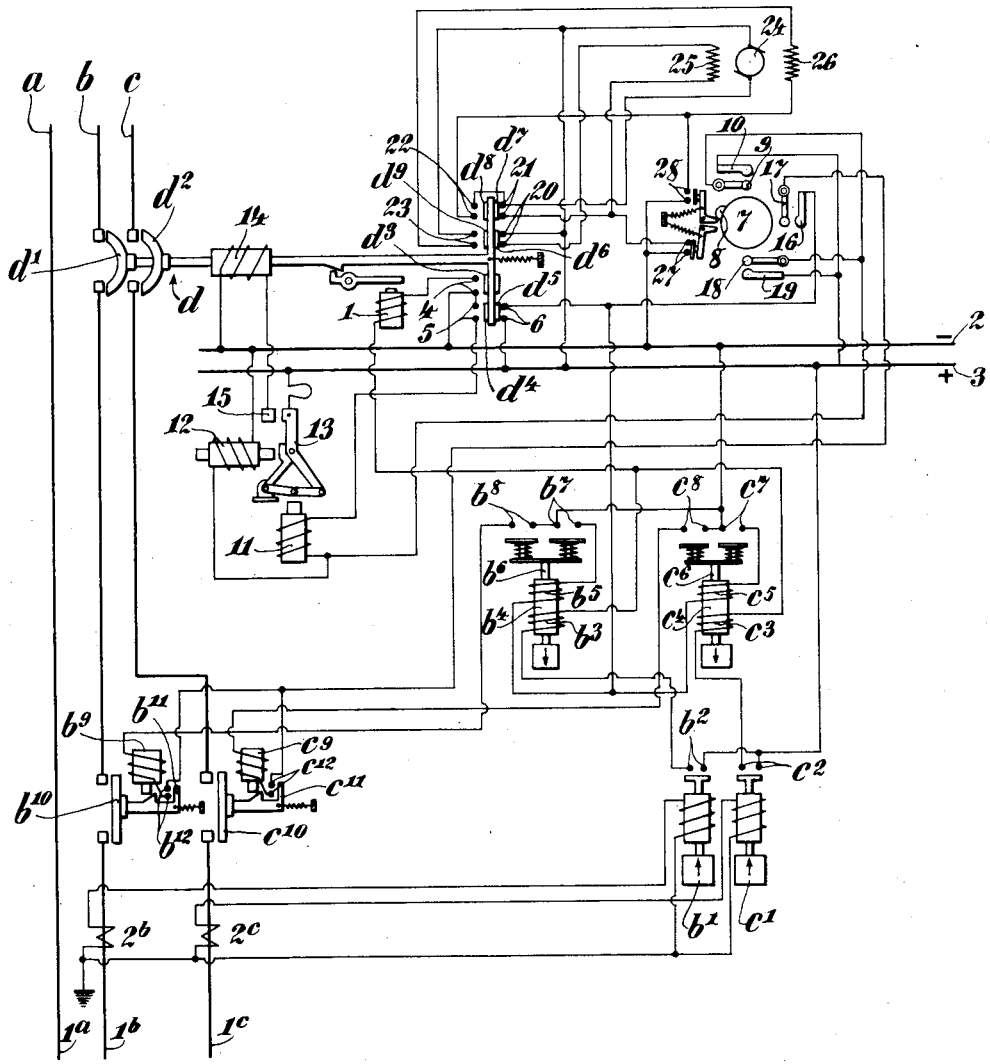
INVENTOR:
William Byrd, Jr.,
BY
Redding, Greeley, O'Shea and Campbell
HIS ATTORNEYS Patented Aug. 20, 1935

2,012,181

UNITED STATES PATENT OFFICE 2,012,181

FAULTY CONDUCTOR CUT-OUT FOR ELECTRICAL DISTRIBUTION SYSTEMS

William Byrd, Jr., Princeton, N. J.

Application June 22, 1933, Serial No. 677,072

2 Claims. (Cl. 175—294)

This invention relates generally to the distribution of electric current for light and power over polyphase A. C. distribution feeders. A polyphase distribution feeder ordinarily supplies both single and polyphase load, protective control being afforded by a polyphase circuit breaker having jointly operated poles and located in a sub-station. It is evident that opening of the circuit breaker in response to a fault causes a complete feeder interruption although fault may not exist on all phases. In such cases it is customary to cut out the faulty phases manually by opening disconnecting switches at the sub-station, so that the remaining phases and the single phase load connected thereto may be restored to service by closing the circuit breaker. The present invention is concerned particularly with devices adapted for association with such circuit breakers in unattended substations whereby faulty conductors among the feeders can be automatically cut out while permitting the service to be continued on all of the good conductors among the feeders, by the automatic reclosing of the circuit breaker. The improvements thus permit the economies of unattended substation operation to be retained while overcoming the principal disadvantages which now arise from the complete interruption of service on all conductors of a feeder extending from an unattended sub-station in case one conductor develops a fault. Such interruption of service continues under present practices, of course, until such time as an operator can reach the sub-station and, having determined which conductors are faulty, restore service on the good conductors by appropriate manual openings and closures, respectively.

A further object of the invention is to accomplish the desired automatic cutout by devices which are certain in operation, inexpensive to manufacture and install, and which shall permit all of the existing equipment to be retained without alteration.

In existing distribution systems, automatic reclosing polyphase circuit breakers are employed. In accordance with the present invention it is proposed to associate with each load conductor a disconnecting switch which shall be opened automatically in case a fault develops in its circuit, during one of the time intervals when the circuit breaker is open. The invention in its preferred embodiment contemplates one reclosing of the circuit breaker without operation of the disconnecting switches so that complete service may be restored in cases where the fault is momentary and does not reappear when the circuit breaker closes. However, the preferred embodiment of the invention does not contemplate that there shall be more than one such reclosure before selective operation of the disconnecting switch for a faulty conductor, because of the serious consequences encountered in the existing practice of providing numerous reclosings in an effort to restore complete service from an unattended sub-station. Such practices are tolerated in order to take advantage of the comparatively few instances where the fault disappears, despite the fact that repeated reclosures are recognized as hazardous for both the conductors and equipment connected therewith. Accordingly, another advantage of the present invention is to retain the benefit of one reclosure in case a momentary fault has disappeared without, however, subjecting a faulty conductor and the equipment associated therewith to the hazard of more than one reclosure in cases where the fault has not disappeared.

More specifically, the invention consists in providing means responsive to abnormal current flow in each feeder circuit which will establish conditions in an auxiliary control circuit permitting automatic opening of a disconnecting switch in the faulty circuit selected. The auxiliary control circuit derives its current from an auxiliary source of power and is so interrelated to normal operations of an automatic reclosing circuit breaker and its reclosing relay, of conventional type, as to bring about the selective opening of a faulty circuit at a time when the circuit breaker is open. As indicated before, it is preferred that this selective opening of the faulty circuit shall occur during the second opening of the circuit breaker following its first reclosure.

As the description proceeds it will be evident that the invention is not concerned with the circuit variations in the feeder system since it provides for the automatic selective interruption of a particular faulty conductor at an unattended sub-station from which the load current flows.

Reference is now to be had to the accompanying drawing which illustrates somewhat conventionally a simple embodiment of the invention applied to a polyphase distribution system, the circuit breaker and its associated controlling mechanisms being shown somewhat diagrammatically because the invention is not limited to the particular type employed.

In the interest of simplicity there has been illustrated a two-phase three wire system, the supply wires being indicated at $a$, $b$ and $c$, $a$ being the neutral a common wire for both phases. The phase conductors are indicated at $b$ and $c$.

$1a$, $1b$, $1c$ of the feeder correspond to $a$, $b$ and $c$, respectively. A polyphase circuit breaker is indicated generally at $d$, its poles $d'$ and $d^2$ controlling the conductors $1b$ and $1c$, respectively. The circuit breaker illustrated is of the latched closed type having a trip coil $1$ wired in an auxiliary circuit with control busses $2$ and $3$ affording a suitable auxiliary source of power. The circuit breaker carries a switch member $d^3$ which controls contacts $4$ wired, respectively, in the circuit of the trip coil $1$ and the negative control bus $2$. The circuit breaker also carries an auxiliary switch $d^4$ which controls contacts $5$ which are wired in the circuit of the negative control bus $2$ and the closing mechanism for the circuit breaker respectively. The circuit breaker also carries another auxiliary switch $d^5$ which controls contacts $6$ which are wired, respectively, in a circuit with the positive control bus $3$ and the disconnecting switches provided in accordance with the invention, as will be later explained. The circuit breaker also carries auxiliary switches $d^6$, $d^7$, $d^8$ and $d^9$, controlling contacts $20$, $21$, $22$, and $23$ respectively, all of which are wired in the operating circuit of reclosing relay $7$. When the circuit breaker is opened, as illustrated in the drawing, auxiliary switches $d^3$, $d^4$, $d^8$ and $d^9$ open, while auxiliary switches $d^5$, $d^6$ and $d^7$ close. When the circuit breaker is closed auxiliary switches $d^3$, $d^4$, $d^8$ and $d^9$ close, while auxiliary switches $d^5$, $d^6$, and $d^7$ open. The reclosing relay $7$ illustrated in the drawing, is of the motor operated type, the cam $8$ being rotated by the motor through reduction gears. Control cam $8$ is shown in its normal or reset position. The operating motor is composed of an armature $24$, a forward field $25$ for clockwise rotation of the cam $8$, and a reverse field $26$ for counterclockwise rotation of cam $8$. Auxiliary switch $27$ is normally closed and opens under the influence of cam $8$ when said cam has rotated clockwise to the point of engagement with the switch arm of $27$. The opening of contacts $27$, breaks the forward motor circuit and prevents further clockwise rotation of cam $8$. Likewise auxiliary switch $28$ breaks the reverse motor circuit and prevents counterclockwise rotation of cam $8$ beyond the point at which $28$ opens under the influence of cam $8$. The wiring for the motive circuit of relay $7$ will be given no detailed explanation because it constitutes no part of the invention and is understood by those skilled in the art. Suffice it to say that when the circuit breaker $d$ opens, the motor of reclosing relay $7$ has its circuit for clockwise rotation of cam $8$ closed and when the circuit breaker $d$ closes, the motor has its circuit for counterclockwise rotation of cam $8$ closed, the ultimate travel of cam $8$ being limited, however, by operation of switches $27$ and $28$ as described. The reclosing relay $7$ is of a type known generally in the prior art, shown, for example, in the patent to Wensley No. 1,786,324, dated December 23, 1930. This patent discloses a reclosing relay of the motor-operated, drum type similar in operation to applicant's reclosing relay $7$. Applicant's motor $24$ and associated field windings $25$ and $26$ correspond to motor $3$ and field windings $15$ and $16$ of the Wensley patent. The function of applicant's limit switches $27$ and $28$ is identical with the function of the limit switch $10$ composed of contacts $20$, $21$ and $22$, and bridging member $24$ of Figure 1 of the patent. Applicant's switches $9$ and $18$ in the reclosing circuit of applicant's circuit breaker $d$ perform a function corresponding to the function of the contacts $25$, $26$ and $27$ and bridging portions $28$ to $33$, inclusive, in the reclosing circuit of circuit breaker $3$ of the patent, Figure 1 thereof. Applicant's contact elements $16$ and $17$ correspond to two additional contacts which would be placed on the reclosing relay $7$, Figure 1 of the patent, adjacent to and similar to contacts $25$, $26$ and $27$, and bridged by a bridging portion to be installed at the desired position of the drum. Operation of applicant's reclosing relay $7$ following the opening of circuit breaker $d$, brings cam $8$ into engagement with a movable switch element $9$ which is wired in circuit with the closing mechanism for the circuit breaker $d$ and is adapted to engage a contact $10$ in circuit with the negative control bus $2$. The closing of switch $9$ initiates operation of the closing mechanism for the circuit breaker as will be understood by one skilled in the art. Referring now to the closing mechanism there is shown a contactor closing coil $12$ which is in circuit with switch $9$ and with the negative control bus $2$; a contactor trip-free coil $11$ which is in circuit with switch $9$ and contact $5$ of switch $d^4$; a closing contactor $13$ which is in circuit with the positive control bus $3$; and a circuit breaker closing coil $14$ which is in circuit with the negative control bus $2$ and with a contact $15$ engageable by the contactor $13$. When contactor coil $12$ is energized by closure of switch $9$, the contactor $13$ will be moved to engage the contact $15$ thereby energizing closing coil $14$ and closing circuit breaker $d$. When circuit breaker $d$ closes, trip-free coil $11$ is energized causing contactor $13$ to break the circuit of closing coil $14$. When reclosing relay $7$ resets switch $9$ opens. Coils $11$ and $12$ become deenergized permitting contactor $13$ to reset in its normal open position.

The elements thus far described and their general relationship and mode of operation form no part of the present invention per se but the means by which the improved control of a faulty conductor is accomplished are interrelated therewith to insure a predetermined time sequence with attendant advantages.

In the preferred embodiment of the present invention it is desired to provide for an initial opening, one reclosing, and a second opening of the circuit breaker before the faulty conductor is automatically cut out. Suitable means for practicing the invention and their circuits in relation to the load feeders, the control bus, and the circuit breaker tripping and reclosing mechanism will now be described.

Load conductors $1b$, $1c$, have associated therewith current transformers $2b$ and $2c$, respectively. In the circuits of these transformers are wired overload relays $b'$ and $c'$, respectively. These relays control contacts $b^2$ and $c^2$, respectively. The contacts $b^2$ are in circuit with the positive control bus $3$ and the winding $b^3$ of a set-up relay $b^4$, respectively, while the contacts $c^2$ are in circuit with the positive control bus $3$ and with the winding $c^3$ of a set-up relay $c^4$, respectively. The windings $b^3$, $c^3$, are in circuit with the trip coil $1$ which controls the circuit breaker. The set-up relays $b^4$, $c^4$, are also responsive to windings $b^5$, $c^5$, which are in circuit with one of the contacts $6$ and the contacts $b^7$, $c^7$, respectively. Switches $b^6$, $c^6$, operated by the set-up relays $b^4$, $c^4$, control contacts $b^7$, $c^7$, in circuit with the windings $b^5$, $c^5$, respectively, and the negative control bus $2$. The switches $b^6$, $c^6$, also control contacts $b^8$, $c^8$, which are in circuit with the negative control bus $2$ and with trip coils $b^9$, $c^9$, respectively. These trip coils control disconnecting switches $b^{10}$, $c^{10}$, in the conductors $1b$, $1c$, respectively. The circuits of the trip coils $b^9$, $c^9$, are normally completed when the switches $b^{10}$, $c^{10}$, are closed through auxiliary switches $b^{11}$, $c^{11}$ carried with the disconnecting switches, respectively. The switches $b^{11}$, $c^{11}$, control contacts $b^{12}$, $c^{12}$, which are in circuit with a contact 16 with which engages a movable switch element 17 under the influence of the cam 8 of the reclosing relay 7. Contact 16 is in circuit with the positive control bus 3 through the contacts 6 of switch $d^5$ carried with the circuit breaker arm.

In describing the operation under varying conditions of use it will be assumed first that a momentary fault has developed between $1a$ and $1b$. The abnormal surge acting on the current transformer $2b$ will operate the overload relay $b'$ causing it to close the contacts $b^2$ and the circuit through the winding $b^3$ of the set-up relay $b^4$. The auxiliary circuit will be completed through the trip coil 1 of the circuit breaker and the switch $d^3$. Thereupon the circuit breaker will open interrupting the service of the two phase feeder $1a$, $1b$, $1c$. The opening of the circuit breaker initiates operation of the reclosing relay 7. The cam 8 of the reclosing relay closes the switch 9 completing the auxiliary circuit through the solenoid 12. The contactor 13 is caused to move closing the circuit through the reclosing coil 14. Referring now to the set-up relay $b^4$, it will be understood that when the coil $b^3$ is energized, as described, the switch $b^6$ closes the contacts $b^7$, respectively, thereby closing the circuit of the winding $b^5$. The circuit of the winding $b^5$ is completed by the switch $d^5$ carried with the circuit breaker so the winding is energized as soon as the circuit breaker opens. On the other hand, the circuit of the winding $b^3$, of the set-up relays $b^4$ is interrupted when the circuit breaker opens by reason of the movement of the switch $d^3$ which controls the contacts 4. The set-up relays $b^4$, $c^4$, are designed for delayed opening so that their switches $b^6$, $c^6$, will remain closed during the brief interval when the circuit breaker is opening and its switches $d^3$, $d^5$, are both momentarily out of engagement with their respective contacts. Assuming now that the fault in conductor $1b$ has disappeared during the time that the circuit breaker is open on its initial opening, it is evident that upon the first reclosing the circuit breaker will remain closed. The winding $b^5$ is deenergized because of the movement of the switch $d^5$ upon the closing of the circuit breaker. The winding $b^3$, having been deenergized upon the initial opening of the circuit breaker, remains dormant because the transformer $2b$ is no longer subject to a surge such as is necessary to initiate operation of the overload relay $b'$. Upon reclosing of the switch $d^4$ the trip free coil 11 is energized to open the contactor 13 and interrupt the circuit of the reclosing coil 14. Switch 9 opens as the reclosing relay 7 returns to its normal setting in accordance with its known action. Contactor 13 resets in its normal open position when switch 9 opens and deenergizes windings 11 and 12.

Assume now that the fault in the conductor $1b$ has not been removed during the interval of the first opening of the circuit breaker. In such a case the overload relay $b'$ will close its contacts $b^2$ upon reclosure of the circuit breaker and immediately cause a second reopening of the circuit breaker. The setup relay $b^4$ which opened upon reclosure of the circuit breaker closes, its operation being the same as on the previous circuit breaker opening. The motor of the reclosing relay 7 continues to operate, opening switch 9 which permits contactor 13 to reset, and bringing the cam 8 into operative engagement with the switch 17 which engages the contact 16. Since the circuit breaker is open the switch $d^5$ is closed hence the trip coil $b^9$ of the disconnecting switch is energized. The disconnecting switch $b^{10}$ of the faulty conductor $1b$ is thereupon opened and remains open. Movement of the disconnecting switch $b^{10}$ causes the supplementary switch $b^{11}$ to open the circuit of its trip coil $b^9$. Continued operation of the reclosing relay causes switch 17 to open and brings the cam 8 into engagement with another switch 18 which engages a contact 19 which is wired to the positive control bus 3. The switch 18 is in circuit with the coil 12 so the contactor 13 is moved into engagement with the contact 15 of the reclosing coil 14 and the circuit breaker is again closed. The reclosing relay 7 now resets to its normal position opening the switch 18 and deenergizes the coils 11 and 12 to permit the contactor 13 to reset in its normal open position. In this condition, the disconnecting switch $b^{10}$ of the faulty conductor $1b$ remains open while normal service is continued over the good conductor $1c$ and the neutral conductor $1a$.

Since the coils $b^9$, $c^9$, are wired in the same manner to relays $b^4$ and $c^4$, respectively, it is evident that they are both subject to the same influences in their respective feeder conductors $1b$ and $1c$ and where fault may develop in both of these conductors both of the disconnecting switches will be thrown out. The number of such conductors, and disconnecting switches may obviously be multiplied without affecting the principle of the invention and the circuits controlled by each and such disconnecting switches may be varied in accordance with existing practice without changing the principle of selective interruption where needed. It will also be evident that suitable controls may be associated with the reclosing relay so that the faulty conductor may be selectively isolated upon the first opening of the circuit breaker or upon any subsequent reopening thereof as may be predetermined. For reasons pointed out, in the preferred embodiment, it is believed to be advisable to permit one reclosure of the circuit breaker and then to provide for the cutting out of a faulty conductor during the ensuing reopening in case the fault has not been removed. This condition reduces the hazard involved in reclosings of the circuit breaker while at the same time affording at least one opportunity for the fault to become corrected before permanently cutting out the conductor. While the invention provides for the continuance of service on all of the good conductors it will be understood that once a faulty conductor is cut out, service on it cannot be restored until its disconnecting switch is reclosed manually, presumably following the correction of the fault.

Permissible changes in the application of the invention have been indicated in connection with the description of the preferred embodiment and other variations within the skill of those familiar with this art will suggest themselves without departure from the underlying principle recited in the appended claims.

I claim as my invention:

1. In combination, a source of electric current, a circuit breaker having a plurality of jointly operated poles, a load circuit controlled by said circuit breaker, an electrically controlled disconnecting switch in each load circuit conductor fed by the circuit breaker and in series relation to said circuit breaker, means responsive to an abnormal current condition in said load circuit for opening said circuit breaker, means operative when said circuit breaker is open for effecting the reclosure thereof, and means responsive to a fault on any of said load circuit conductors for opening the disconnecting switch of the faulty conductor at a time when the circuit breaker is open after the circuit breaker has been closed and reopened due to a continued fault.

2. In combination, a source of electric current, a circuit breaker having a plurality of jointly operated poles, a load circuit composed of a plurality of conductors controlled by the poles of said circuit breaker, respectively, an overload relay for each of said load conductors responsive to an abnormal current condition therein, an auxiliary source of electric current, set-up relays wired in said auxiliary circuit and controlled by said overload relays, respectively, a disconnecting switch in each of said load conductors, means controlling the opening of said disconnecting switches, said means being included in said auxiliary circuit and controlled by the said set-up relays, respectively, means included in said auxiliary circuit for opening and closing said circuit breaker, said opening being controlled by said overload relays, and a reclosing relay controlling the operation of the said closing means for said circuit breaker and also the operation of the means for opening said disconnecting switches after the circuit breaker has been closed and reopened due to a continued fault.

WILLIAM BYRD, Jr.